Dec. 6, 1927.

W. THOMPSON ET AL 1,652,068

DIVISION OF FEEDING TROUGHS FOR TIED CATTLE

Filed Sept. 22, 1927

INVENTORS
W. THOMPSON,
W. R. THOMPSON,
By Jno Imrie
ATTY.

Patented Dec. 6, 1927.

1,652,068

UNITED STATES PATENT OFFICE.

WILLIAM THOMPSON, OF BROOKVILLE, WEXFORD, AND WILLIAM REGINALD THOMPSON, OF THE QUAY, WEXFORD, IRELAND.

DIVISION OF FEEDING TROUGHS FOR TIED CATTLE.

Application filed September 22, 1927, Serial No. 221,263, and in Great Britain March 10, 1926.

This invention has for its object to facilitate the cleansing and disinfection of continuous troughs for feeding tied up cattle, and the dividing or keeping apart of the several feeds of same so that fast eating beasts may not rob their neighbours.

This we effect by means of transverse swinging divisions of wood or metal, but preferably of metal, and which divisions shall in their shape fairly approximate to the outline of the sides and bottom of said trough.

Said divisions are hinged to and swing on round bars set horizontally athwart the trough from the tying or dividing stanchions as the case may be, to corresponding uprights or other supports at the opposite side of said trough.

When one of these swinging divisions is in its normal position, as dividing the feeds of adjacent animals, it is firmly held against side pressure by means of a metal stop together with a sliding bolt set in front wall or curb of said trough—which sliding bolt and fixed stop will retain the division between them.

A bar of wood or metal placed higher up increases the separation of said animals and said bar being fixed slightly out of centre relatively to the swinging division underneath serves as a support to the latter when swung bottom upwards.

Obviously by withdrawing the sliding bolt the division can be thus swung up so as to rest its lower edge against the overhead bar or against a suitable attachment to same, so exposing the trough underneath for cleansing or disinfecting operations.

Our invention will be best described by the accompanying drawing:—

Figure 1:
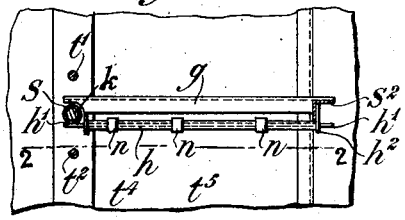
Fig. 1 is a plan view showing the feeding trough and the division therefor in operative position.
Figure 2:
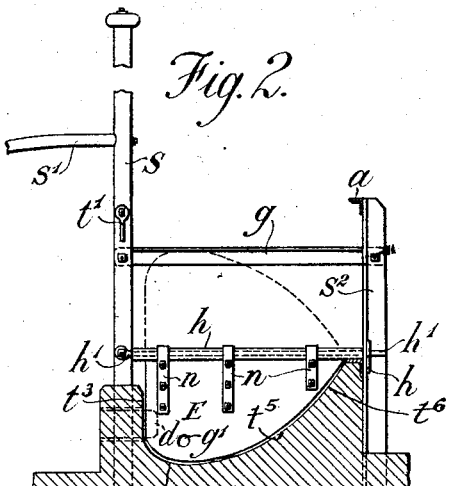
Fig. 2 is a section on line 2—2 of Fig. 1.

S represents a tubular tying stanchion of metal which when fitted with a quadrant bar S' (partly shown in Fig. 2) makes a suitable stall division for cattle tied either singly or in pairs. This stanchion S is set in the curb or rear wall of the trough as may be seen more clearly in Fig. 2. $S^2$ Figs. 1 and 2 is a metal stanchion of angle section set at the front of the trough.

To and between these stanchions S and $S^2$ we affix our swinging or lift-up division which division may be of wood or metal but preferably the latter. This swinging or lift-up division E lies (unseen) in Fig. 1 directly beneath the hinge $h$ which last is metal and tubular. Said division is rigidly fastened to this tubular hinge $h$ by means of the straps $n$ $n$ $n$. The whole is borne by, and swings on the hinge bar $h'$. The ends only of the latter are seen in the drawings, the one a loop or eye whereby it is bolted to the stanchion S and the other its point showing through the intermediate plate $h^2$ by means of which plate it is attached by bolts to the stanchion $S^2$.

Figure 3:
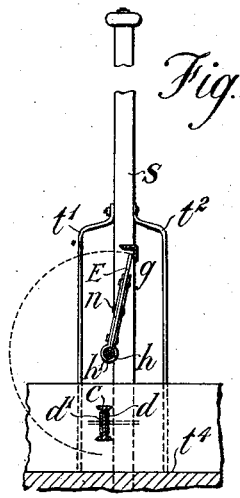
Fig. 3 is an end view, the division being shown in elevated or inoperative position.

The shape of the interior of the trough is seen in the curved line $t^3$ $t^4$ $t^5$ and $t^6$. The swinging or lift-up division E is shown in its normal position and as may be noticed it nearly but not quite corresponds in shape to the interior outline of the trough, same being desirable in cases where soft food is supplied to the animals. The dotted line shown at $d$ close to the rear wall or curb of the trough, represents a projecting metal plate which acts as a stop to prevent the division E when in place from moving other than in one direction. Said division is prevented from being pushed back by a sliding or locking bolt set in the curb parallel to the above mentioned plate stop, which locking bolt $d'$ when pushed inwards in conjunction with said stop $d$ effectually secures the division E against thrust from the animals. When this locking bolt is pushed outward it sets free the swinging division E which by means of the finger hole $g'$ in same, can be lifted up so as to lean against the overhead bar $g$ as shown in Fig. 3, also by its dotted outline in Fig. 2. Said overhead bar $g$ shown in Fig. 2 and in section in Fig. 3 being fixed slightly out of centre relatively to the division E underneath, automatically supports the latter when so lifted up for cleaning purposes.

The said overhead bar $g$ also acts as an additional means of separation between adjoining animals.

The tying stanchion S has tying bars $t'$ and $t^2$ fixed in the curb or front wall of the trough. Fig. 3 shows the positions of the locking apparatus in same and the swinging division E is shown lifted up and resting against the overhead bar $g$ leaving the bottom of the trough $t^4$ exposed for cleansing.

Figure 6:
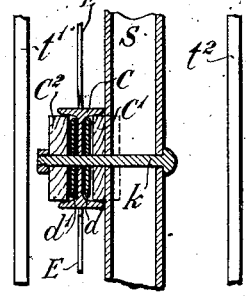
Fig. 6 is a section on line 6—6 of Fig. 4.
Figure 5:
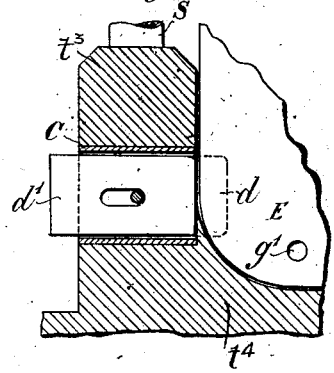
Fig. 5 is a vertical section through the same, the trough being omitted.
Figure 4:
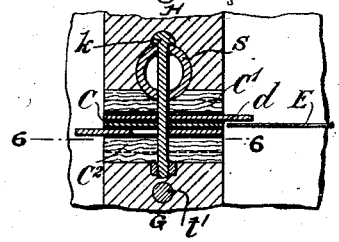
Fig. 4 is a horizontal section taken through the stanchion and means for holding the stanchion in operative position, the division being shown in edge view.

Figs. 4, 5 and 6 are enlarged views showing the details of the locking apparatus which as before mentioned is fixed in the curb of the trough. Fig. 4 illustrates the fixed plate or stop $d$ which is secured by the bolt $k$ in the I-beam C as seen more clearly in Fig. 5. The bolt $k$ passing through the stanchion S, the stop plate $d$, the I-beam C and the sliding or locking bolt $d'$ together with the external wood covers $C'$ and $C^2$ maintains the whole locking apparatus in position pending, during and subsequent to the completion of the curb of the trough.

In Fig. 6, the lower rear edge of the swinging division E is seen in position intercepted by the stop $d$ (the latter being shown by a dotted line). The sliding bolt $d'$ is shown withdrawn, with its outer end clear of the curb, and the slot which gives it freedom to move back and forth to the left hand side of the bolt $k$. Obviously when the said bolt $d'$ is pushed in, this slot will be at the right hand side of the bolt $k$.

Obviously the bolt $d$ may be formed exactly as is the bolt $d'$, that is, with the slot permitting movement of such bolt $d$, thus permitting movement of the division E in either direction at will. As the alternative construction consists merely in slotting the bolt $d$ to duplicate the formation of the bolt $d'$, specific illustration is not believed necessary.

Whilst our trough divisions are specially applicable to cattle tied in pairs as in double stalls, they are equally applicable to those in single stalls whether tied or secured by means of bails.

We do not confine ourselves to any particular material for stanchions used in connection with these swinging or lift-up trough divisions—such may be of wood, metal, or ferro concrete, even a slab of the latter serving also as a stall division may be used to take the place of the stanchion S as herein described.

Neither do we confine ourselves to attaching these swinging divisions to the tying or other usual stanchions of stall divisions, it being quite usual to tie cattle to the curb or front of a trough.

In the absence of suitable stanchions, tying or otherwise to which our swinging divisions may be attached convenient and safe uprights coupled to span the trough and carry the said divisions may be used substantially as herein described.

What we claim is:—

1. In a continuous trough for feeding cattle, divisions having an edge outline corresponding to the sectional contour of the interior of the trough, cross bars supported above and transversely of the trough for swingingly supporting said divisions, and a limit bar supported above the cross bar and vertically offset therefrom, said limit bar serving to support the divisions in inoperative position relative to the trough.

2. In a continuous trough for feeding cattle, a division having an edge outline corresponding to the transverse interior contour of the trough, a cross bar arranged transversely of the trough on which the division is swingingly supported, and means carried by the trough to be projected into the path of movement of the division when in the trough to prevent movement of said division relative to the trough.

3. In a continuous trough for feeding cattle, a division having an edge outline corresponding to the transverse interior contour of the trough, a cross bar arranged transversely of the trough on which the division is swingingly supported, a fixed stop carried by the trough against which one side of the division abuts when said division is in operative position in the trough, and a sliding bolt operative to overlie the opposite side of the division when in the trough, whereby to prevent movement of the division in either direction.

In testimony whereof we have hereunto signed our names.

WM. THOMPSON.
WILLIAM R. THOMPSON.